(12) United States Patent
Kim

(10) Patent No.: US 12,370,980 B2
(45) Date of Patent: Jul. 29, 2025

(54) AUTONOMOUS DRIVING SENSOR CLEANING SYSTEM FOR A VEHICLE

(71) Applicants: HYUNDAI MOTOR COMPANY, Seoul (KR); KIA CORPORATION, Seoul (KR)

(72) Inventor: Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/534,149

(22) Filed: Dec. 8, 2023

(65) Prior Publication Data
US 2025/0100515 A1    Mar. 27, 2025

(30) Foreign Application Priority Data
Sep. 25, 2023 (KR) .................... 10-2023-0127613

(51) Int. Cl.
| | | |
|---|---|---|
| *B60S 1/56* | (2006.01) | |
| *B60S 1/04* | (2006.01) | |
| *B60S 1/38* | (2006.01) | |
| *B60S 1/54* | (2006.01) | |

(52) U.S. Cl.
CPC .............. *B60S 1/566* (2013.01); *B60S 1/0477* (2013.01); *B60S 1/0486* (2013.01); *B60S 1/38* (2013.01); *B60S 1/544* (2013.01); *B60S 2001/3834* (2013.01)

(58) Field of Classification Search
CPC ...... B60S 1/566; B60S 1/0477; B60S 1/0486; B60S 1/38; B60S 1/544; B60S 2001/3834; B60S 1/54; B60S 1/0411; B60S 1/56; G01S 2007/4977; G01S 7/4813; G01S 17/931; G02B 27/0006; B08B 1/12; B08B 1/32; B08B 5/00; B60Y 2304/05; B60Y 2400/301
USPC ............................................. 15/246
See application file for complete search history.

(56) References Cited

U.S. PATENT DOCUMENTS

| | | | |
|---|---|---|---|
| 11,203,326 B2 | 12/2021 | Nam et al. | |
| 11,535,204 B1* | 12/2022 | Lombrozo | .............. B08B 1/165 |
| 2020/0108797 A1 | 4/2020 | Nam et al. | |
| 2020/0180569 A1 | 6/2020 | Seo | |
| 2022/0203938 A1* | 6/2022 | Gilbertson | ......... G02B 27/0006 |
| 2022/0234547 A1 | 7/2022 | Lee | |

FOREIGN PATENT DOCUMENTS

| | | | | |
|---|---|---|---|---|
| KR | 20200070907 A | | 6/2020 | |
| KR | 102301660 B1 | | 9/2021 | |
| KR | 20230067981 A | * | 5/2023 | .............. B08B 1/04 |
| KR | 102552085 B1 | | 7/2023 | |

* cited by examiner

*Primary Examiner* — Katina N. Henson
(74) *Attorney, Agent, or Firm* — Lempia Summerfield Katz LLC

(57) ABSTRACT

An autonomous driving sensor cleaning system for a vehicle includes a rotatable cover unit configured to surround a sensor such as a cylindrical sensor. The system also includes a cleaning unit coupled to the cover unit to transmit a rotation driving force to the cover unit and configured to clean the cover unit by friction while being rotated in a direction opposite to the rotation direction of the cover unit. The system also includes a rotation driving unit coupled to the cleaning unit and configured to transmit the rotation driving force to the cleaning unit.

11 Claims, 8 Drawing Sheets

AUTONOMOUS DRIVING SENSOR CLEANING SYSTEM FOR A VEHICLE

CROSS-REFERENCE TO RELATED APPLICATION

This application claims under 35 U.S.C. § 119 (a) the benefit of priority to Korean Patent Application No. 10-2023-0127613 filed on Sep. 25, 2023, the entire contents of which are incorporated herein by reference.

BACKGROUND

(a) Technical Field

The present disclosure relates to an autonomous driving sensor cleaning system for a vehicle, and more specifically, to an autonomous driving sensor cleaning system, which enables cleaning of a sensor without using cleaning liquid, thereby reducing cost and improving performance and merchantability.

(b) Background Art

Generally, autonomous driving vehicles are equipped with at least one light detection and ranging (LiDAR) sensor to recognize nearby objects.

The LiDAR sensor functions as the eyes of a vehicle that support safe autonomous driving for detecting terrain and objects around the vehicle by transmitting a laser signal and receiving a reflected signal.

In the case of the LiDAR sensor, since the transmission and reception sensitivities of the laser signal have a significant impact on detection (recognition) performance due to optical characteristics, a lens cover should always be kept clean by preventing foreign substances from sticking to the lens cover.

However, foreign substances such as dust, insects, and muddy water inevitably stick to the lens cover of the LiDAR sensor due to an external environment while the vehicle travels. This results the detection performance being degraded.

Therefore, conventionally, a technology of spraying a washer fluid on the lens cover of the LiDAR sensor has been developed to address this problem. However, a complete cleaning effect may not be expected only by spraying the washer fluid as described above.

For example, there is a problem in that, when time elapses while the vehicle does not travel, foreign substances attached to the lens cover may harden. Also, when highly viscous foreign substances stick to the lens cover, the lens cover may not be completely cleaned even when the washer fluid is sprayed.

In addition, for the technology of spraying the washer fluid on the lens cover of the LiDAR sensor, there is a problem in that, since a plurality of components should be included to implement the technology, a weight of the vehicle is increased, sometimes significantly, due to a large component layout and the necessity for a component such as a fluid pump. In addition, since a plurality of pipes are required in the vehicle, the structure for such technology is complicated, and the cost is very expensive, resulting in an increase in the cost of the cleaning system and the vehicle.

SUMMARY OF THE DISCLOSURE

The present disclosure is directed to providing an autonomous driving sensor cleaning system for a vehicle. The disclosed system includes a cover for protecting a sensor, such as a cylindrical sensor, and enables effective cleaning for the sensor without using separate air or cleaning liquid. The disclosed system achieves this by allowing the cover to be rotated in a different direction relative to a cleaning unit by the rotation of the cleaning unit that is coupled to or engaged with a rotation driving unit. This rotation removes foreign substances such as rainwater and dust attached to the cover. The cost is thereby reduced according to the elimination of the pipes for spraying air or a cleaning liquid and performance and merchantability are thereby improved.

An autonomous driving sensor cleaning system for a vehicle according to the present disclosure is provided. The system includes a cover unit configured to be mounted to surround a sensor, such as a cylindrical sensor. The cover unit is rotatable. The system also includes a cleaning unit coupled to the cover unit to transmit a rotation driving force to the cover unit and configured to clean the cover unit by friction while being rotated in a direction opposite to the rotation direction of the cover unit. The system also includes a rotation driving unit coupled to the cleaning unit and configured to transmit the rotation driving force to the cleaning unit.

The cover unit may include a cover body configured to accommodate a sensor therein. The cover unit may also include a cover gear member integrally formed to protrude from an edge of the cover body, coupled to the cleaning unit, and configured to be rotated by the rotation driving force transmitted from the cleaning unit.

The autonomous driving sensor cleaning system may further include a mounting plate disposed in a mounting area of a body panel for mounting the cover unit and configured to guide the cleaning unit and the rotation driving unit to be fastened.

The cover unit may include a first protective cover coupled to a lower portion of the mounting plate and a second protective cover coupled to an upper portion of the mounting plate and configured to surround the cleaning unit.

The first protective cover may have a shape the corresponds with the mounting plate and may be configured to support the sensor and the rotation driving unit.

The second protective cover may have an open one side that is rounded to correspond to a shape of the cover unit, may be disposed to face the cover unit, and may have another side that has a discharge hole to discharge foreign substances removed by and from the cleaning unit.

The cleaning unit may include a brush member disposed in contact with an outer circumferential surface of the cover body. The cleaning unit may also include a support member configured to support the brush member and that is coupled to the cover gear member to transmit the rotation driving force to the cover body.

The brush member may have a cylindrical shape and may be made of a fiber material.

The rotation driving unit may include a rotation motor configured to provide the rotation driving force and may include a motor gear member coupled to the support member and configured to be rotated as the rotation motor is driven to transmit the rotation driving force to the support member.

The rotation driving unit may further include a rotation fan formed so that a blade is rotated as the rotation driving force is provided from the rotation motor.

The rotation fan may be coupled via a shaft to the rotation motor to be close to a lower portion of the brush member.

The blade may be coupled to the rotation fan to have a rotation radius overlapping a rotation radius of the brush member.

According to the present disclosure, by including the cover for protecting a sensor, effective cleaning of the sensor is enabled without using separate air or cleaning liquid. Cleaning is achieved through contact friction by the cover rotating in a different direction from the cleaning unit via the rotation of the cleaning unit, which is coupled to the rotation driving unit. This rotation removes foreign substances such as rainwater, dust, and other contaminants attached to the cover. Thus, it is possible to reduce the cost of such a cleaning system by eliminating the needs for the pipes for spraying air or a cleaning liquid and, thus, to improve performance and merchantability.

In addition, according to the present disclosure, by mounting the rotation fan on the rotation driving unit and allowing the blade of the rotation fan to be rotated generates a strong air flow or air current toward the cleaning unit when the rotation driving unit is driven. Thus, it is possible to quickly remove foreign substances attached to the contaminated cleaning unit.

It should be understood that the terms "automobile", "automotive", or "vehicular" or other similar terms as used herein are inclusive of motor vehicles in general. Such motor vehicles may encompass passenger automobiles including sports utility vehicles (SUVs), buses, trucks, various commercial vehicles, watercraft including a variety of boats and ships, aircraft, and the like. Such motor vehicles also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, such as for example, a vehicle that is both gasoline-powered and electric-powered.

The above and other features of the disclosure are discussed below.

BRIEF DESCRIPTION OF THE DRAWINGS

The above and other features of the present disclosure are described in detail with reference to certain examples thereof illustrated in the accompanying drawings, which are given herein below by way of illustration only, and thus are not limiting of the present disclosure, and wherein.

Figure 1:
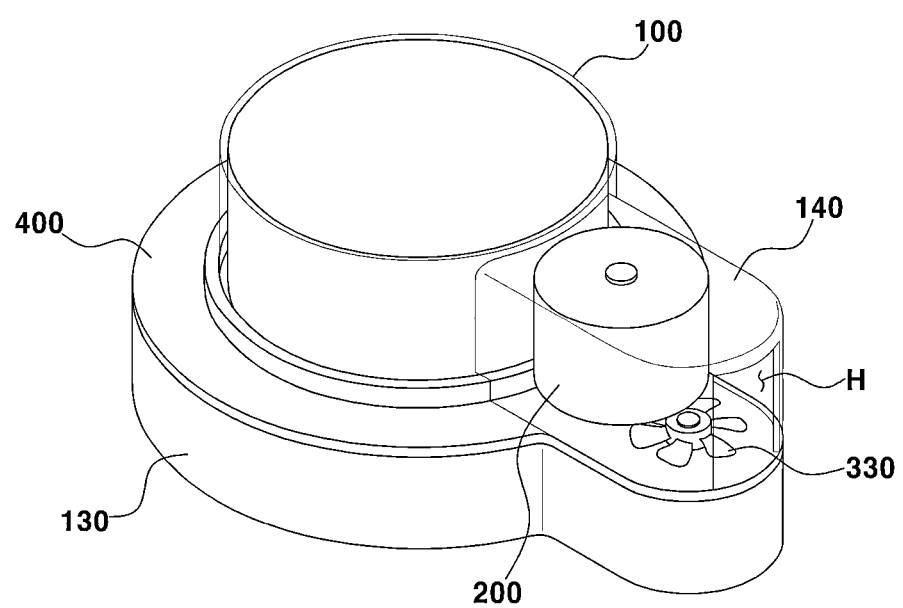
FIGS. 1 and 2 are views illustrating a structure of an autonomous driving sensor cleaning system for a vehicle according to an embodiment of the present disclosure.

It should be understood that the appended drawings are not necessarily drawn to scale, presenting a somewhat simplified representation of various features illustrative of the basic principles of the disclosure. The specific design features of the present disclosure as described herein, including, for example, specific dimensions, orientations, locations, and shapes will be determined in part by the particular intended application and use environment.

In the drawing figures, the same reference numbers refer to the same or equivalent parts of the present disclosure throughout the several figures of the drawings.

DETAILED DESCRIPTION

Hereinafter, embodiments according to the present disclosure are described in detail with reference to the accompanying drawings.

Advantages and features of the present disclosure and methods for achieving them should become clearer with reference to the embodiments described below in detail in conjunction with the accompanying drawings.

However, the present disclosure is not limited to the embodiments disclosed below. The embodiments and technical concepts of the present disclosure may be implemented in various different forms. The disclosed embodiments are merely provided to make the disclosure of the inventive concepts more complete and to fully inform those of ordinary skill in the art to which the present disclosure pertains of the scope of the present disclosure. The present disclosure should only be defined by the scope of the appended claims.

In addition, in the description of the present disclosure, where it has been determined that related known technologies may obscure the gist of the present disclosure, a detailed description thereof has been omitted.

Figure 2:
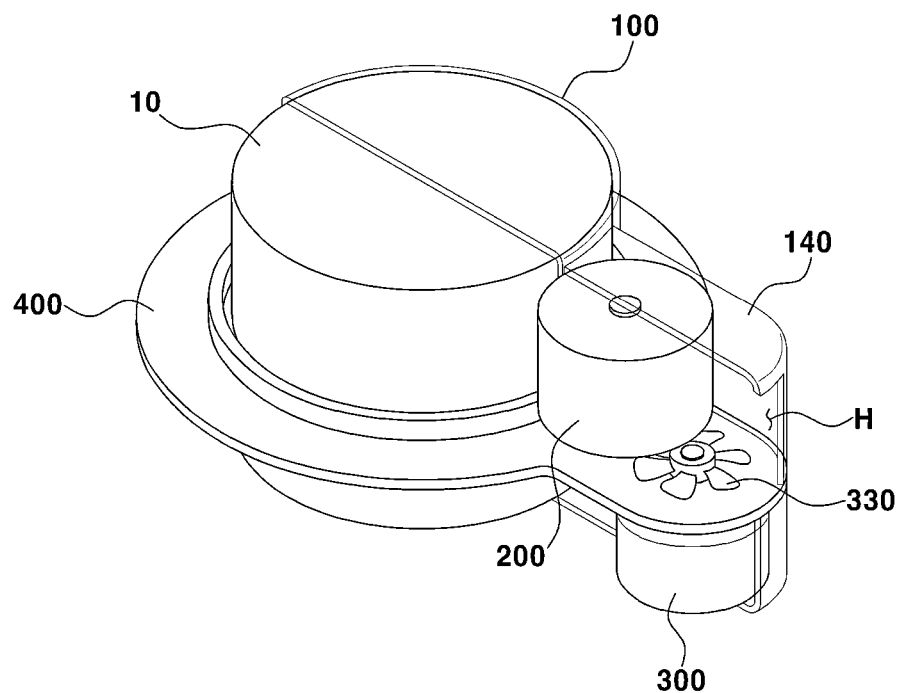
Figure 3:
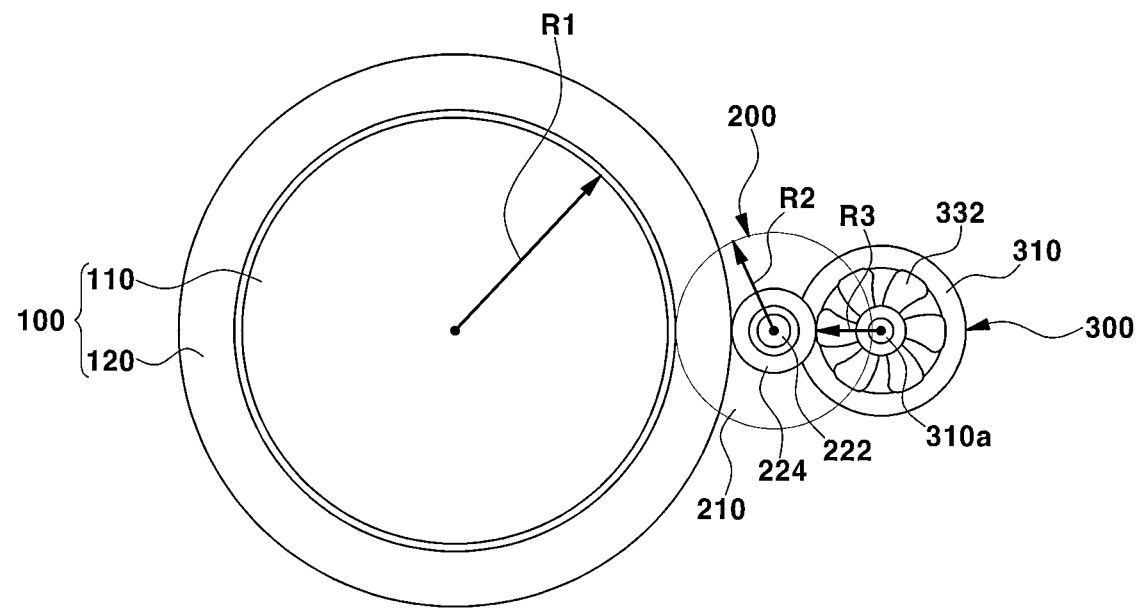
FIG. 3 is a view illustrating rotation radii of a cover unit, a cleaning unit, and a rotation driving unit of an autonomous driving sensor cleaning system according to an embodiment of the present disclosure.
Figure 4:
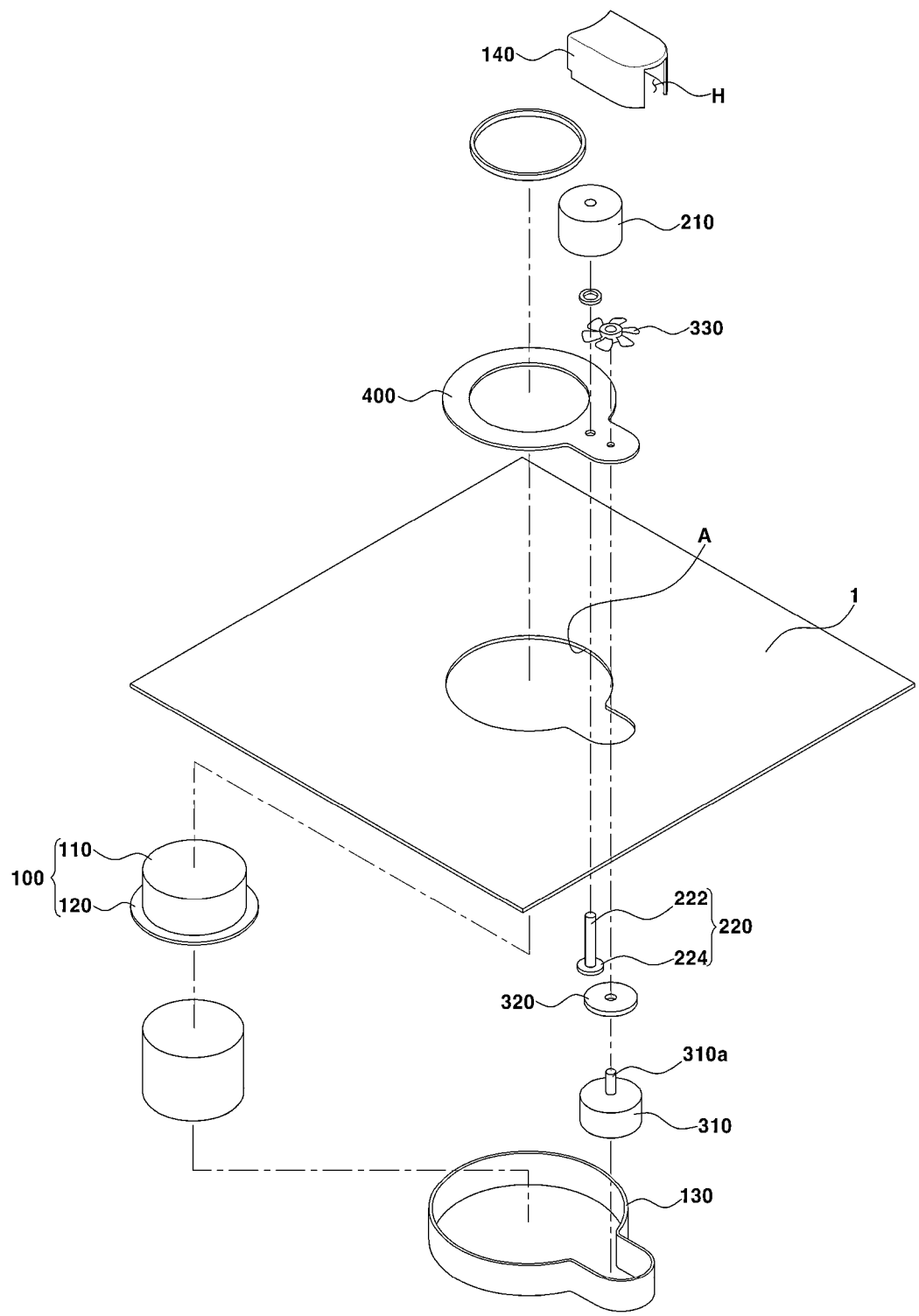
FIG. 4 is an exploded view illustrating the components of an autonomous driving sensor cleaning system according to an embodiment of the present disclosure.

FIGS. 1 and 2 are views illustrating a structure of an autonomous driving sensor cleaning system for a vehicle according to an embodiment of the present disclosure. FIG. 3 is a view illustrating rotation radii of a cover unit, a cleaning unit, and a rotation driving unit of an autonomous driving sensor cleaning system for a vehicle according to an embodiment of the present disclosure. FIG. 4 is an exploded view of an autonomous driving sensor cleaning system for a vehicle according to an embodiment of the present disclosure.

Figure 5:
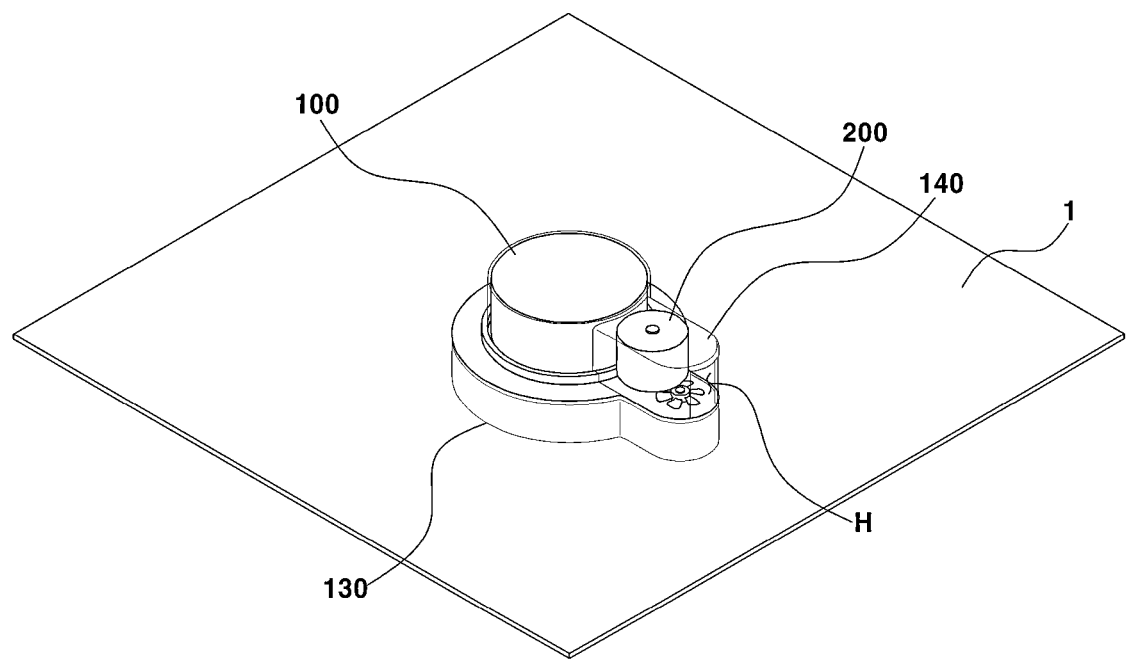
FIG. 5 is a view illustrating an assembled state of the autonomous driving sensor cleaning system of FIG. 4 according to an embodiment of the present disclosure.
Figure 6:
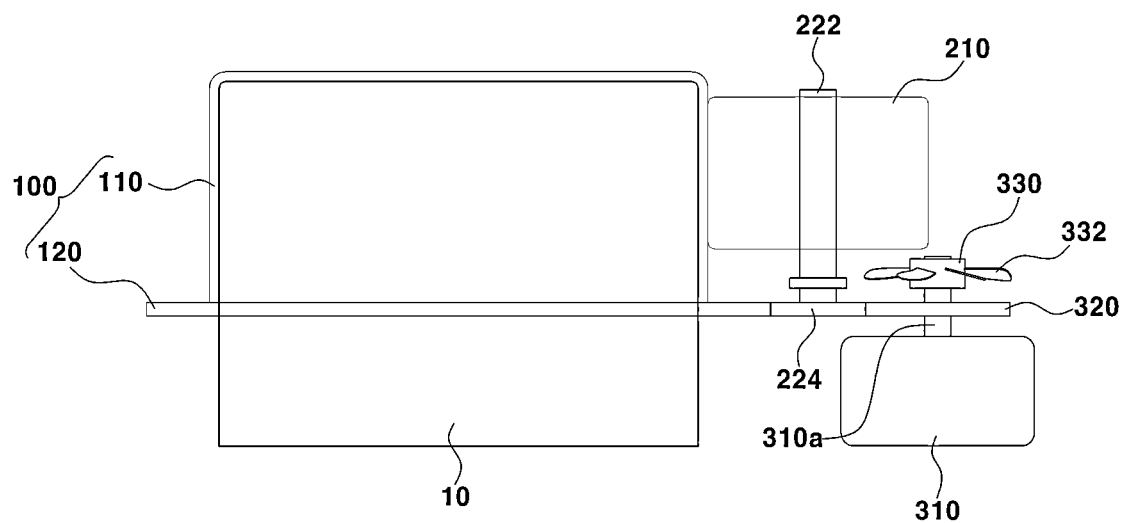
FIG. 6 is a view illustrating a rotation fan of an autonomous driving sensor cleaning system according to an embodiment of the present disclosure.

In addition, FIG. 5 is a view illustrating an assembled state of the autonomous driving sensor cleaning system for a vehicle according to FIG. 4. FIG. 6 is a view illustrating a rotation fan of an autonomous driving sensor cleaning system for a vehicle according to an embodiment of the present disclosure.

Figure 7:
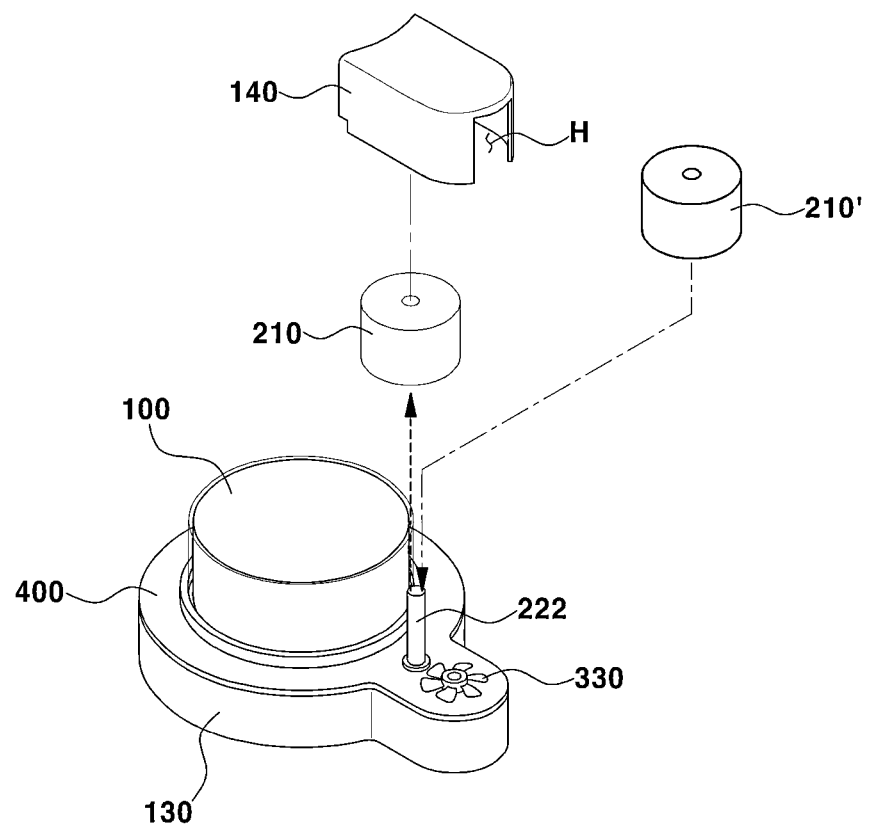
FIG. 7 is a view illustrating replacement of the cleaning unit of an autonomous driving sensor cleaning system according to an embodiment of the present disclosure.
Figure 8:
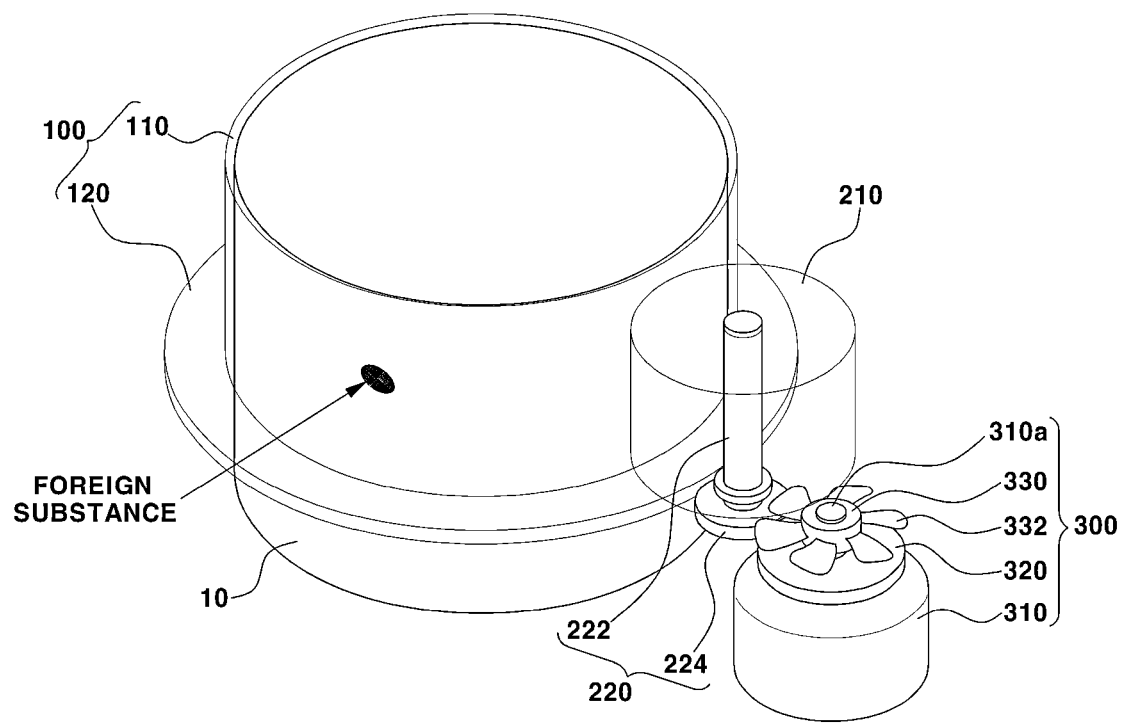
FIGS. 8-10 are views illustrating that foreign substances are sequentially removed from a surface by an autonomous driving sensor cleaning system according to an embodiment of the present disclosure.
Figure 9:
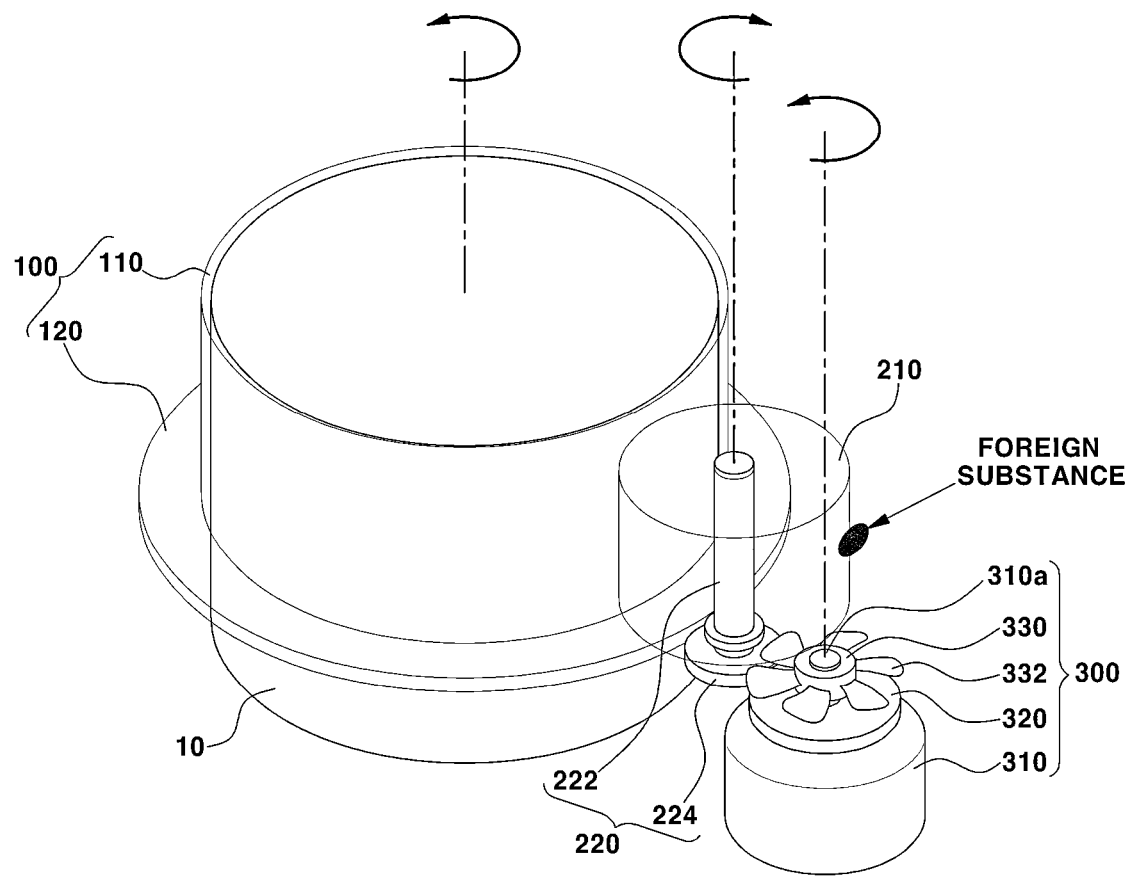
Figure 10:
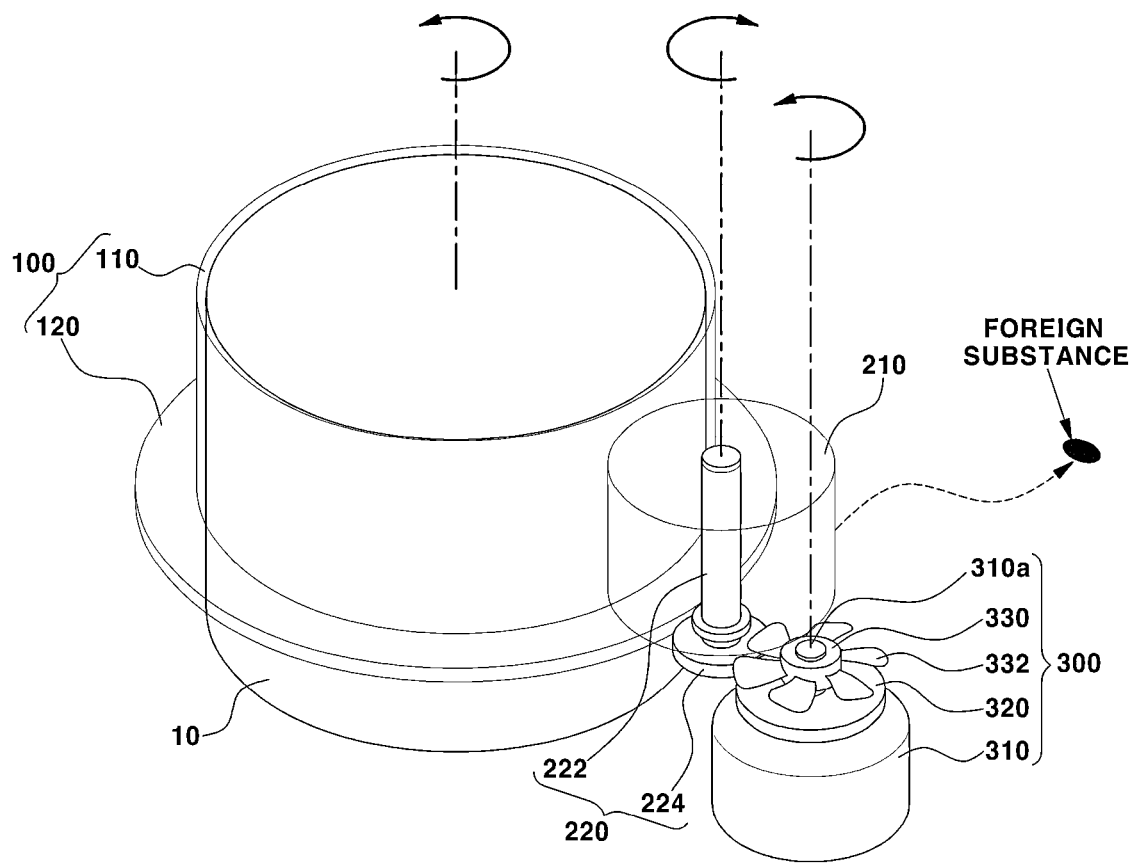

In addition, FIG. 7 is a view illustrating the replacement of the cleaning unit of an autonomous driving sensor cleaning system for a vehicle according to an embodiment of the present disclosure. FIGS. 8-10 are views illustrating the sequential removal of foreign substances from a portion of an autonomous driving sensor cleaning system for a vehicle according to an embodiment of the present disclosure.

As illustrated in FIGS. 1 and 2, an autonomous driving sensor cleaning system includes a cover unit 100, a cleaning unit 200, and a rotation driving unit 300.

The cover unit 100 is configured to be mounted to surround a sensor, such as a cylindrical sensor 10. For example, the sensor 10 may be part of a light detection and ranging (LiDAR) and the cover unit 100 may be configured to cover and surround the sensor 10. The cover unit is provided so as to be rotatable relative to the sensor 10.

In other words, the LiDAR is intended to recognize and determine an accurate and safe travel environment by being used together with cameras and radar equipment in autonomous driving vehicles. Since the LiDAR typically may have a large-sized cylindrical shape, it may be difficult to achieve satisfactory cleaning only by spraying air or a washer fluid on the sensor lens.

Therefore, the cover unit 100 may surround the sensor 10 so as to protect the sensor 10 from the outside environment. As illustrated in FIG. 3, upon rotating, a rotation radius R1 of the cover unit 100 overlaps a rotation radius R2 of the cleaning unit 200 to perform cleaning by friction, thereby enabling sufficient cleaning without using separate air or washer fluid.

As illustrated in FIG. 4, the cover unit 100 includes a cover body 110 and a cover gear member 120.

The cover body 110 is formed in a cylindrical shape and in this example accommodates the cylindrical shape of the sensor 10 therein.

The cover body 110 is made of a transparent material both to protect the sensor 10 from the outside environment and to secure or maintain optical detection performance of the sensor through the cover body 110.

The cover gear member 120 may integrally protrude from an edge of the cover body 110, coupled to or engaged with the cleaning unit 200, and formed and configured to be rotated together by a rotation driving force transmitted from the cleaning unit 200. In this example, the cover gear member 120 is in the form of a flange protruding from the cover body 110.

In other words, the cover gear member 120 may have a plurality of gear teeth formed on an outer circumferential surface thereof and is coupled to or engaged with a support member 220 of the cleaning unit 200, which is described below. When the support member 220 is rotated, the cover gear member 120 allows the cover body 110 to be rotated in a direction opposite to the cleaning unit 200.

In addition, the cover unit 100 may further include a first protective cover 130 and a second protective cover 140 in addition to the cover body 110 and the cover gear member 120.

The first protective cover 130 is coupled to a lower portion of a mounting plate 400.

More specifically, as illustrated in FIG. 4, the mounting plate 400 is disposed in a mounting area A of a body panel 1 of a vehicle for the mounting the cover unit 100. The mounting plate 400 guides the cleaning unit 200 and the rotation driving unit 300 to be fastened correctly. The first protective cover 130 is coupled to the lower portion of the mounting plate 400 and is positioned under the body panel 1.

In an embodiment, the first protective cover 130 is formed and configured to have the same shape as, i.e., a shape that corresponds with the shape of the mounting plate 400. The first protective cover 130 also internally supports the sensor 10 and the rotation driving unit 300, and at the same time, protects the sensor 10 and the rotation driving unit 300 from foreign substances such as rainwater, dust, and other contaminants.

The second protective cover 140 is coupled to an upper portion of the mounting plate 400 and is formed and configured to surround the cleaning unit 200.

The second protective cover 140 has an open one side that is rounded to correspond to a shape of the cover unit 100 and is disposed to face the cover unit 100. As illustrated in FIG. 5, the second protective cover 140 has another or opposite side that is provided with a discharge hole H to discharge foreign substances such as rainwater and dust removed by and from the cleaning unit 200 to the outside.

Meanwhile, the cleaning unit 200 is coupled to or engaged with the cover gear member 120 provided on the cover unit 100 to transmit the rotation driving force. As the cleaning unit 200 is rotated in a direction opposite to the cover unit 100, the cleaning unit 200 is formed to clean the cover body 110 by the friction caused by the surface contact therebetween.

To this end, the cleaning unit 200 includes a brush member 210 and a support member 220.

When the brush member 210 is rotated by the received rotation driving force in a state of being disposed in contact with an outer circumferential surface of the cover body 110, the brush member 210 is rotated in a direction opposite to the cover body 110 to remove the foreign substances attached to the cover body 110.

In an embodiment, the brush member 210 may be made of a fiber material such as microfiber to minimize damage to the cover body 110 and still effectively remove the foreign substances.

In addition, the support member 220 supports the brush member 210 through a support guide 222 disposed upright at a predetermined length. As illustrated in FIG. 6, the support member 220 is coupled to or engaged with the cover gear member 120 through a rotation guide 224 on which the plurality of gear teeth are formed to transmit the rotation driving force for the rotation in opposite directions relative to the cover body 110.

Meanwhile, the rotation driving unit 300 is coupled to or engaged with the cleaning unit 200 and formed to transmit the rotation driving force to the cleaning unit 200.

To this end, the rotation driving unit 300 includes a rotation motor 310 and a motor gear member 320.

The rotation motor 310 is formed to selectively provide the rotation driving force upon the user's request for removing foreign substances.

In addition, as illustrated in FIG. 6, the motor gear member 320 is coupled to or engaged with the support member 220 and rotated as the rotation motor 310 is driven to transmit the rotation driving force to the support member 220.

In other words, the motor gear member 320 is coupled to a rotational shaft 310a of the rotation motor 310 to be rotated together. The motor gear member 320 is coupled to or engaged with the rotation guide 224 on which the plurality of gear teeth are formed and which is connected to the support member 220 to transmit the rotation driving force for the rotation in a direction opposite to the rotation guide 224.

In addition, the rotation driving unit 300 may further include a rotation fan 330.

The rotation fan 330 is coupled to the rotational shaft 310a on the upper portion of the mounting plate 400. The rotation fan 330 is formed and configured so that the plurality of blades 332 coupled to the rotational shaft 310a are rotated as the rotation driving force is provided from the rotation motor 310.

In an embodiment, as illustrated in FIG. 6, the rotation fan 330 is shaft-coupled to the rotation motor 310 to be close to the lower portion of the brush member 210.

In an embodiment, the plurality of blades 332 are coupled to and provided on the rotation fan 330 and have a rotation radius that overlaps a rotation radius of the brush member 210.

As illustrated in FIGS. 3 and 6, this is intended to allow the foreign substances such as rainwater, dust, and other contaminants attached to a surface of the brush member 210 to be effectively removed by the air flow generated by the rotation of the blades 332 through the overlap between a rotation radius R3 of the blade 332 and the rotation radius R2 of the brush member 210.

More specifically, as illustrated in FIG. 8, when it is determined that foreign substances such as rainwater and dust are attached to the cover body 110, the user transmits a control signal for driving the rotation motor 310 to a control unit (not illustrated).

Therefore, as illustrated in FIG. 9, the motor gear member 320 is rotated and the support member 220 is rotated in connection therewith so that the brush member 210 is rotated in a direction opposite to a rotation direction of the rotation motor 310.

At this time, the rotation guide 224 of the support member 220 is coupled to or engaged with the motor gear member 320 and the cover gear member 120 from one side and the other side thereof, respectively. Thus, when the rotation guide 224 is rotated, the cover gear member 120 is rotated in a direction opposite to the rotation guide 224 and, thus, the brush member 210 and the cover body 110 are rotated in opposite directions.

As a result, as illustrated in FIG. 10, friction occurs between the cover body 110 and the brush member 210 rotating in opposite directions. The foreign substances attached to the cover body 110 may be removed by the brush member 210 and the removed foreign substances are then attached to the brush member 210. A strong air flow is generated by the operation of the blades 332 of the rotation fan 330 rotating as the rotation motor 310 is rotated as described above. The foreign substances attached to the brush member 210 may then also be removed.

Here, the foreign substances removed from the brush member 210 are discharged to the outside through the discharge hole H of the second protective cover 140 (see FIG. 5). The brush member 210 for cleaning the cover body 110 thus may always be maintained in a clean state and, as necessary, the brush member 210 may be replaced through only a simple separation operation.

In other words, as illustrated in FIG. 7, the cleaning system can be refurbished when the brush member 210 is severely contaminated, such as when the autonomous driving vehicle is operated for a long time, or specifically, when it is difficult to remove the foreign substances only by operating the blade 332. After the first protective cover 130 is removed from the mounting plate 400, when the brush member 210 is separated from the support guide 222 and another brush member 210' in a clean state is mounted to correspond to the brush member 210, the brush member 210 in the contaminated state may be easily replaced.

According to the present disclosure, by including the cover for protecting a sensor, such as a cylindrical sensor, effective cleaning for the sensor is enabled without using separate air or cleaning liquid. This is achieved by allowing the cover to be rotated in a different direction from the cleaning unit by the rotation of the cleaning unit. The cleaning unit is coupled to or engaged with the rotation driving unit to be rotated in order to remove foreign substances such as rainwater and dust attached to the cover. Thus, it is possible to reduce the cost of the cleaning system by the elimination of the pipes for spraying air or a cleaning liquid and to improve performance and merchantability.

In addition, according to the present disclosure, the rotation fan is mounted on the rotation driving unit and the blades of the rotation fan are allowed to be rotated to transmit a strong air flow toward the cleaning unit when the rotation driving unit is driven. Thus, it is possible to quickly remove foreign substances attached to the contaminated cleaning unit.

The technical concepts of the present disclosure have been described above with reference to the embodiment(s) illustrated in the drawings. However, it should be understood that this is only illustrative, and various modifications can be made to the disclosed embodiments by those of ordinary skill in the art, and all or some of the above-described embodiment(s) may also be configured in selective combinations thereof. Therefore, the true technical scope of the present disclosure should be determined by the technical spirit of the appended claims.

What is claimed is:

1. An autonomous driving sensor cleaning system for a vehicle, the cleaning system comprising:
   a cover unit configured to surround a sensor and to be rotatable;
   a cleaning unit coupled to the cover unit, the cleaning unit configured to transmit a rotation driving force to the cover unit and to clean the cover unit by friction while being rotated in a direction opposite to a rotation direction of the cover unit; and
   a rotation driving unit coupled to the cleaning unit and configured to transmit the rotation driving force to the cleaning unit, the rotation driving unit having a rotation motor configured to provide the rotation driving force,
   wherein the cover unit includes a cover body configured to accommodate a sensor therein, and a cover gear member integrally formed to protrude from an edge of the cover body, coupled to the cleaning unit, and configured to be rotated by the rotation driving force transmitted from the cleaning unit,
   wherein the cleaning unit includes a brush member disposed in contact with an outer circumferential surface of the cover body, and a support member configured to support the brush member and coupled to the cover gear member to transmit the rotation driving force to the cover body,
   wherein the rotation driving unit further includes a rotation fan configured so that a blade is rotated by the rotation driving force provided from the rotation motor, and a motor gear member coupled to be engaged with the support member and rotated as the rotation motor is driven to transmit the rotation driving force to the support member.

2. The cleaning system of claim 1, wherein the brush member is formed in a cylindrical shape and made of a fiber material.

3. The cleaning system of claim 1, wherein the rotation fan is shaft-coupled to the rotation motor to be close to a lower portion of the brush member.

4. The cleaning system of claim 1, wherein the blade is coupled to the rotation fan to have a rotation radius overlapping a rotation radius of the brush member.

5. The cleaning system of claim 1, further comprising a mounting plate disposed in a mounting area of a body panel for mounting the cover unit and configured to guide the cleaning unit and the rotation driving unit to be fastened.

6. The cleaning system of claim 5, wherein the cover unit includes: a first protective cover coupled to a lower portion of the mounting plate; and a second protective cover coupled to an upper portion of the mounting plate and formed to surround the cleaning unit.

7. The cleaning system of claim 6, wherein the first protective cover is shape corresponding to the mounting plate and is configured to support a sensor and the rotation driving unit.

8. The cleaning system of claim 6, wherein the second protective cover has an open one side with a shape that corresponds to a shape of the cover unit, is disposed to face the cover unit, and has another side with a discharge hole configured to discharge foreign substances removed by the cleaning unit.

9. The cleaning system according to claim 1, further comprising a sensor disposed within and covered by the cover unit.

10. The cleaning system according to claim 9, wherein the sensor is a cylindrical sensor.

11. A vehicle comprising the autonomous driving sensor cleaning system of claim 1.

\* \* \* \* \*